United States Patent [19]

Watanabe et al.

[11] 4,363,839
[45] Dec. 14, 1982

[54] TRIM STRIP FOR VEHICLES

[75] Inventors: Yutaka Watanabe, Toyoake; Hirochika Nishio, Nagoya, both of Japan

[73] Assignee: Aisin Seiki Kabushiki Kaisha, Japan

[21] Appl. No.: 242,392

[22] Filed: Mar. 10, 1981

[30] Foreign Application Priority Data

Mar. 10, 1980 [JP] Japan .................. 55-30742[U]

[51] Int. Cl.³ .................. B32B 15/08; B60R 13/02
[52] U.S. Cl. .................. 428/31; 52/717; 293/1; 428/463
[58] Field of Search ........... 428/31, 463; 52/717; 293/1

[56] References Cited

U.S. PATENT DOCUMENTS

| | | | |
|---|---|---|---|
| 2,549,315 | 4/1951 | Kramer | 52/400 X |
| 2,654,919 | 10/1953 | Marvin | 52/208 |
| 3,016,590 | 1/1962 | Shanok et al. | 428/157 X |
| 3,189,143 | 6/1965 | Adams | 52/208 |
| 3,338,007 | 8/1967 | Drapling | 52/208 |
| 3,419,458 | 12/1968 | Brooks et al. | 428/163 |
| 3,471,355 | 10/1969 | Truesdell et al. | 428/31 X |
| 3,572,799 | 3/1971 | Truesdell et al. | 428/167 X |
| 3,572,799 | 3/1971 | Truesdell | 428/167 X |
| 3,714,751 | 2/1973 | Lackey | 52/400 |
| 3,745,056 | 7/1973 | Jackson | 428/31 X |
| 3,766,697 | 10/1973 | Jackson | 52/718 X |
| 3,783,568 | 1/1974 | Adler et al. | 52/400 |
| 3,851,432 | 12/1974 | Griffin | 52/400 |
| 3,981,697 | 9/1976 | Buckthorpe | 52/400 |
| 4,094,056 | 6/1978 | Takeda et al. | 428/31 X |
| 4,103,400 | 8/1978 | Munse | 428/31 X |
| 4,163,076 | 7/1979 | Katoh | 428/31 X |

FOREIGN PATENT DOCUMENTS 52-96013 7/1977 Japan ........................ 428/31

Primary Examiner—Henry F. Epstein
Attorney, Agent, or Firm—Finnegan, Henderson, Farabow, Garrett & Dunner

[57] ABSTRACT

A trim strip for vehicles comprising an elongated plastic body defining an interior channel and opposed base edges defining an opening to the channel and being disposed proximate the vehicle surface; an elongated flexible soft plastic element integrally secured to the body at each base edge between the body and the vehicle surface; a stainless steel foil bonded to the exterior surface of the body, the foil having opposed foil edges secured to respective base edges; engaging means for securing the body to the vehicle surface, the engaging means being disposed in the channel and having opposed edges adjacent the interior surface of the base edges; and complementary interlocking means on the adjacent surfaces of the respective base and engaging means edges for securing the engaging means to the body and preventing relative motion between the body and the engaging means caused by thermal deformation.

8 Claims, 10 Drawing Figures

TRIM STRIP FOR VEHICLES

BACKGROUND OF THE INVENTION

1. Field of the Invention

The present invention relates to a trim strip for vehicles. More particularly, the invention relates to a trim strip which permits normal expansion and contraction due to thermal changes without affecting the security of the strip.

2. Description of the Prior Art

In recent years, it has become quite common for automobile manufacturers to attach trim strips to motor vehicles for decorative and protective purposes. Particularly, trim strips have been attached to rocker panels, side and door panels and hoods.

Generally these known trim strips are elongated members including a composite layer of reinforcing plastic and stainless steel foil. These trim strips are generally secured to the surface of the vehicle at spaced locations by engaging members made of heat resistant plastic.

The commonly used trim strips comprise cooperating layers of metal foil and plastic having different thermal coefficients of expansion and contraction. In the heat of summer, the reinforcing plastic layer and metal layer undergo a greater degree of expansion than the heat resistant engaging member of the trim strip. While longitudinal expansion and contraction of the trim strip is insignificant, relative expansion and contraction of the trim strip components in the cross-sectional direction can be quite large.

Because of the different thermal coefficents of the components of trim strips, after the plastic portions of the trim strips have been expanded and contracted, clearances are created between the plastic engaging member and the trim strip. These clearances loosen the components of the trim strip and noise may be generated by vibration or impact. Furthermore, the clearances may be significant enough for the components of the trim strip to separate.

SUMMARY OF THE INVENTION

The present invention is an improved trim strip for vehicles which obviates the aforementioned drawbacks of the conventional trim strips. The objects and advantages of the invention may be realized and attained by means of the instrumentalities and combinations particularly pointed out in the appended claims.

In accordance with the invention, as embodied and broadly described herein, the trim strip for attachment to the exterior surface of a vehicle comprises an elongated plastic base body having an exterior surface, the lateral cross-sectional shape of the base body defining an interior channel, and opposed base edges defining an opening to said channel and for being disposed proximate the vehicle surface; an elongated, flexible, soft plastic element integrally secured to the base body at each of the base edges between the base body and the vehicle surface; a stainless steel foil bonded to the exterior surface of the base body, the foil having opposed foil edges secured to respective edges of the base body; engaging means for securing the base body to the vehicle surface, the engaging means being disposed in the channel and having opposed edges adjacent the interior surface of respective base edges; and complementary interlocking means on adjacent surfaces of respective base and engaging means edges for securing the engaging means to the base body.

Preferably, the complementary interlocking means comprises a shoulder projecting from each engaging means edge disposed in engagement with a complementary recess in the adjacent surface of each respective base edge or a shoulder projecting from the interior surface of each base edge disposed in engagement with a complementary recess in the adjacent surface of each respective engaging means edge.

It is also preferred that the engaging means comprise a planar member having opposed edges each disposed adjacent the inside surface of a respective base edge, a finger integral with and projecting from one side of the planar member between the opposed edges and engaging the inside surface of the base body, and a leg integral with and projecting from the other side of the planar member between the opposed edges for fixed insertion in a hole in the vehicle surface.

It is also preferred that each opposed edge of the foil be inwardly bent and secured to the exterior surface of a respective one of the base edges between the base body and the plastic element. Each opposed edge of the foil may also be inwardly bent around and inserted into a respective one of the base edges.

BRIEF DESCRIPTION OF THE DRAWING

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
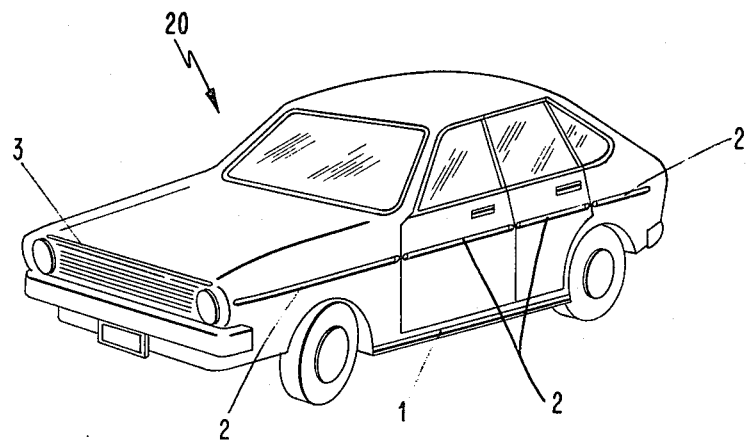
FIG. 1 is a perspective view of an autombile depicting trim strips in various locations.

Referring to FIG. 1, it may be seen that rocker trim strip 1, side trim strip 2, and hood trim strip 3, are attached to the surface of automobile 20.

Figure 2:
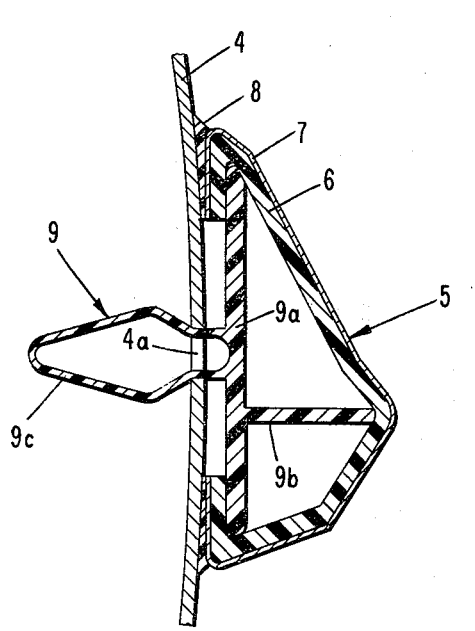
FIG. 2 is a cross-sectional view of a conventional trim strip.

Conventional trim strip 5, as depicted in FIG. 2, includes a base body 6 made of plastic such as acrylonitrile-butadiene-styrene (ABS), acryl plastics, polycarbonate plastics, etc. and a stainless steel foil 7 having a thickness of about 0.2 mm bonded on the exterior surface of the base body 6. A flexible soft plastic element 8 is integrally formed on the trim strip 5 for contact with the vehicle surface 4.

Engaging member 9 is composed of polyacetal plastic having high heat resistance and includes a vertical wall portion 9a, two projecting portions 9b extending at right angles from one side of vertical wall portion 9a, and leg portion 9c extending from the other side of vertical wall portion 9a and fixedly inserted into hole 4a in the vehicle surface 4. Engaging member 9 is disposed within the interior channel formed by base body 6 with leg portion 9c extending outwardly therefrom. Opposed edges of vertical wall portion 9a and the remote ends of projecting portions 9b of engaging member 9 engage the inner surface of base body 6 and then leg portion 9c of engaging member 9 is inserted into hole 4a of the vehicle surface 4 so as to engage the trim strip 5 with the vehicle surface 4. The number of holes 4a in the vehicle surface 4 and the number of cooperating engaging members 9 are determined in accordance with the longitudinal dimension of trim strip 5.

In the conventional trim strip 5 of FIG. 2, the engaging member 9 is formed of heat resistant plastic, thermal deformation of which is minimized. The base body 6, however, has a different thermal coefficient of expansion such that its shape may change at temperatures of about 80° centigrade with the significant expansion occurring in a cross-sectional direction of trim strip 5. Consequently, the inner channel of base member 6 is enlarged and a clearance is generated between base member 6 and the engaging member 9. The clearance between engaging member 9 and base body 6 permits rattles and loosening of the trim strip 5 and may cause separation of the base body 6 from the engaging member 9.

In accordance with the invention, the trim strip comprises an enlongated plastic base body having an exterior surface, a cross-sectional shape defining an interior channel, and opposed base edges defining an opening to the channel and being disposed proximate the vehicle surface. Preferably, as depicted in the embodiments of FIGS. 3-7, elongated plastic base body 12 has an exterior surface, a cross-sectional shape defining an interior channel 21, and opposed base edges 12b disposed proximate vehicle surface 4 and defining an opening to channel 21. Common elements in the embodiments of FIGS. 3-10 have been identified with common numerals.

In accordance with the invention, an elongated flexible, soft plastic element is integrally secured to the base body at each of the base edges between the base body and the vehicle surface. In the embodiments depicted in FIGS. 3-7, elongated flexible, soft plastic elements 14 are integrally secured to each base edge 12b of base body 12 and disposed between base body 12 and vehicle surface 4.

Figure 3:
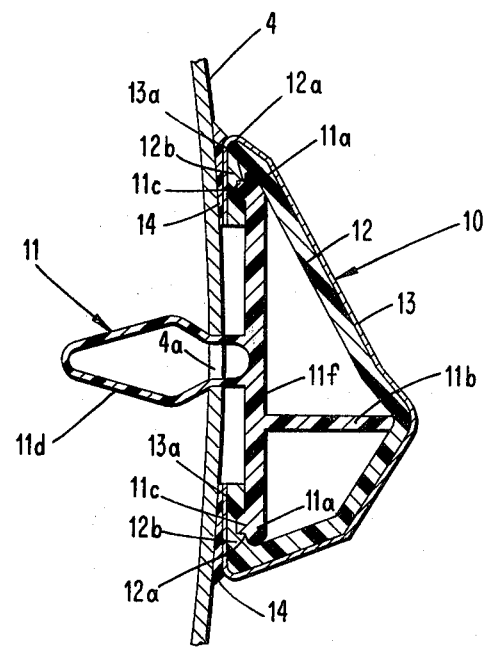
FIG. 3 is a cross-sectional view of one embodiment of the trim strip of the present invention.
Figure 4:
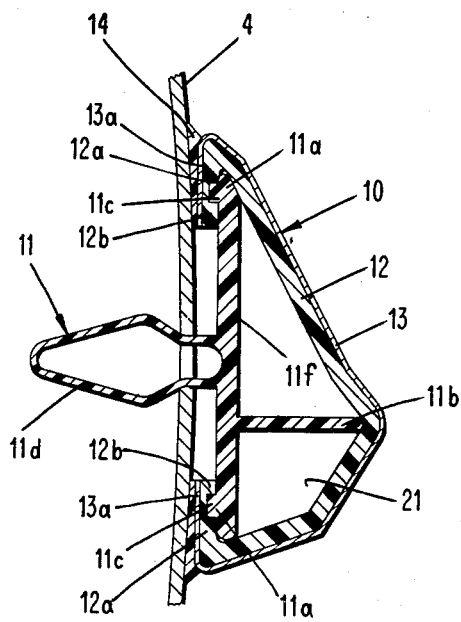
FIG. 4 is a cross-sectional view of a second embodiment of the trim strip of the present invention.
Figure 6:
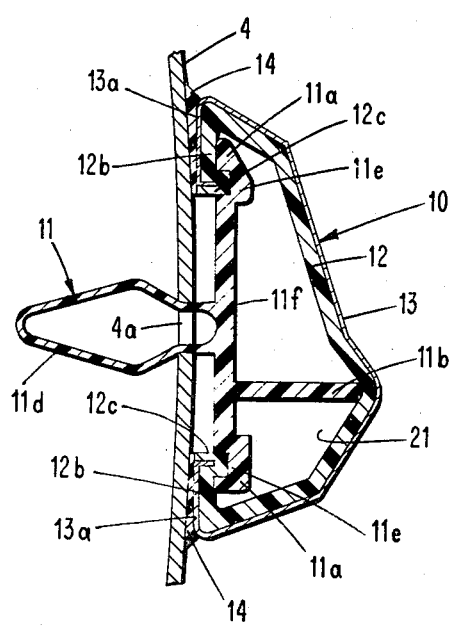
FIG. 6 is a cross-sectional view of a fourth embodiment of the trim strip of the present invention.
Figure 7:
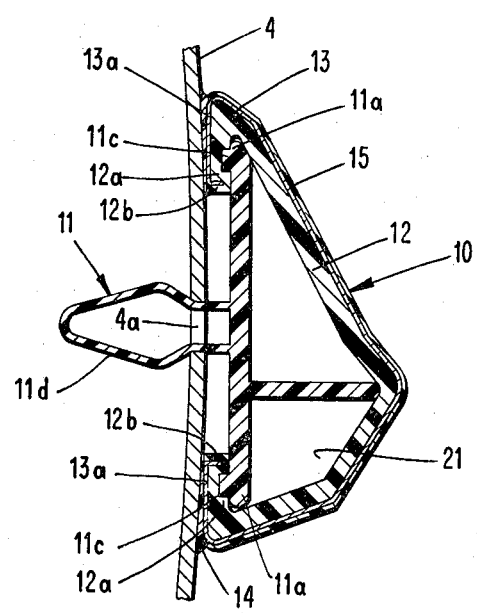
FIG. 7 is a cross-sectional view of a fifth embodiment of the trim strip of the present invention.
Figure 8:
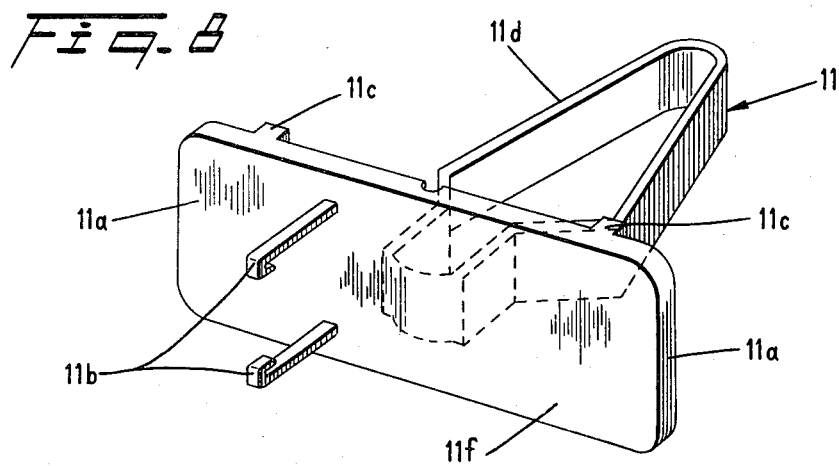
FIG. 8 is a perspective view of the engaging member for the trim strip of FIG. 4.

In accordance with the invention, a stainless steel foil is bonded to the exterior surface of the base body, the foil having opposed foil edges secured to respective edges of the base body. Preferably, as depicted in FIGS. 3-7, foil 13 is bonded to and covers the exterior surface of base body 12. The foil 13 has opposed foil edges 13a conforming to the surface of base edges 12b and disposed between base edges 12b and plastic elements 14. The foil edges 13a of foil 13 may only be planar as depicted in FIG. 4 or preferably, may be further bent inwardly and inserted into base edges 12b as depicted in FIGS. 3, 6 and 7.

Preferably, the material and characteristics of base body 12 and foil 13 are substantially the same as known trim strips discussed above.

In accordance with the invention, the trim strip includes engaging means for securing the base body to the vehicle surface, the engaging means being disposed in the channel and having opposed edges adjacent the interior surface of the respective base edges. As here embodied and depicted in FIGS. 3-10, the engaging means 11 comprises a planar member 11f having opposed edges 11a each being disposed adjacent the inside surface of respective base edges 12a. The opposed edges 11a of planar member 11f may abut the inside surface of base body 12 as depicted in FIGS. 3-5 and 7 or may be spaced therefrom as seen in FIG. 6.

Preferably, the engaging means 11 further comprises a pair of fingers 11b integral with and projecting from one side of planar member 11f between opposed edges 11a. As seen in FIGS. 3-7, the ends of fingers 11b remote from planar member 11f engage the inner surface of base body 12. It is preferred that fingers 11b project from planar member 11f at substantially a right angle and that the cross-sectional shape of base body 12 be such as to provide a groove for receiving the ends of fingers 11b remote from planar member 11f.

It is also preferred that engaging means 11 further comprise leg 11d as seen in FIGS. 3-10. Leg 11d is integral with and projects from the other side of planar member 11f between opposed edges 11a thereof and is adapted for being fixedly inserted into hole 4a in vehicle surface 4. Leg 11d has a shape permitting flexible snap fitting of leg 11d through hole 4a and sufficient resilience to reassume its shape after insertion through hole 4a to prevent retraction of engaging means 11 from vehicle surface 4. Preferably, leg 11d projects from planar member 11f at substantial right angle thereto.

In accordance with the invention, the trim strip further comprises complementary interlocking means on adjacent surfaces of respective base and engaging means edges for securing the engaging means to the base body.

Figure 5:
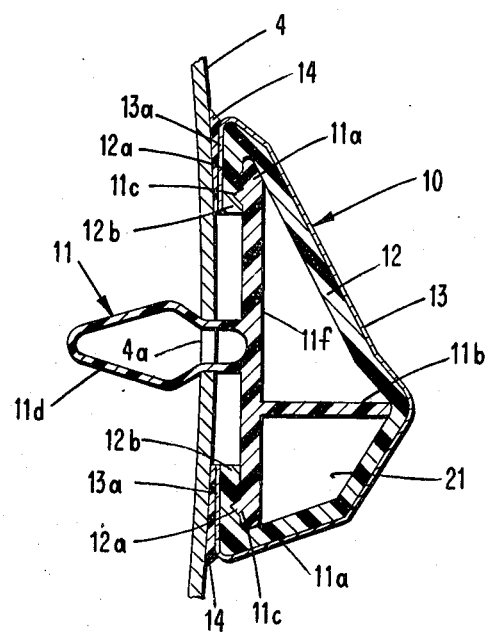
FIG. 5 is a cross-sectional view of a third embodiment of the trim strip of the present invention.
Figure 9:
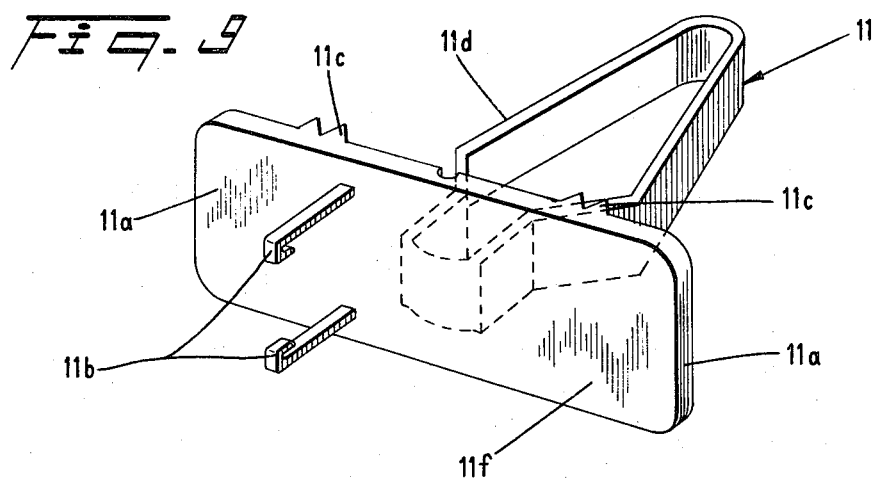
FIG. 9 is a perspective view of the engaging member of the trip strip of FIG. 5.

Preferably, as depicted in FIGS. 3, 4, 5 and 7, the complementary interlocking means comprises a shoulder 11c projecting from each edge 11a of engaging means 11 which is disposed in engagement with a complementary recess 12a in the adjacent surface of each respective base edge 12b. As seen in FIGS. 3, 4, 7 and 8, the shoulder 11c has a rectangular cross-sectional shape as does the complementary recess 12a. However, it may be preferred to have a pair of spaced shoulders 11c having V-shaped cross-section engaging complementary V-shaped recesses 12a as seen in FIGS. 5 and 9.

Figure 10:
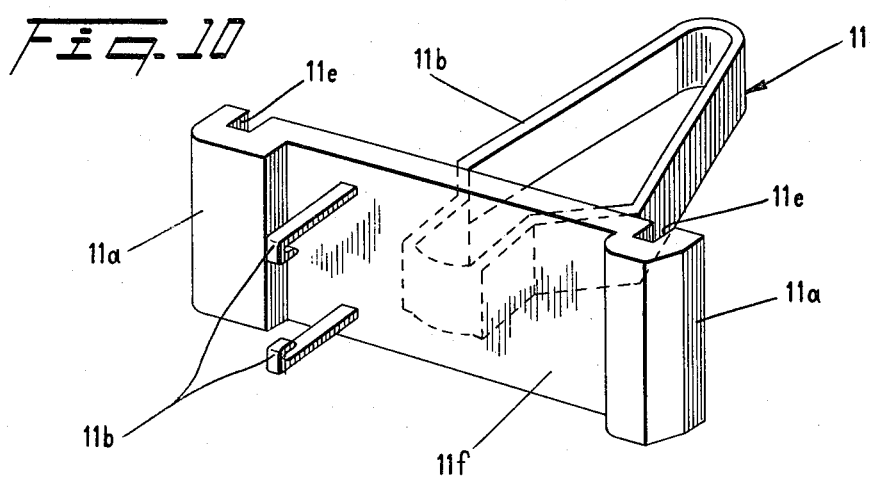
FIG. 10 is a perspective view of the engaging member of FIG. 6.

In an alternative embodiment depicted in FIGS. 6 and 10, the complementary interlocking means comprises a shoulder 12c projecting from the inner surface of base edge 12b and engaging a complementary recess 11e in edges 11a of engaging means 11.

In either case, shoulders 11c, 12c are fixedly inserted in complementary recesses 12a, 11e, respectively, securing engaging means 11 to base body 12 thereby preventing relative movement between engaging means 11 and base body 12 caused by thermal expansion and contraction.

As depicted in FIG. 7, it may be preferred to cover the steel foil 13 with a layer of soft flexible plastic 15, to provide a layer having heat and cold durability. The layer of plastic 15 may be of the same material as plastic element 14 or may be made of another plastic such as rigid chlorinated polyvinyl plastic.

The invention disclosed provides a trim strip for vehicles which overcomes the disadvantages of the prior art created by the differentials of thermal expansion and contraction. It will be apparent to those skilled in the art, that various modifications and variations could be made in the trim strips of the invention without departing from the scope or spirit of the invention.

What is claimed is:

1. A trim strip for attachment to the exterior surface of a vehicle, said trim strip comprising:
 (a) an elongated plastic base body having an exterior surface, the lateral cross-sectional shape of the base body defining an interior channel, and opposed base edges defining an opening to said channel and for being disposed proximate said vehicle;
 (b) an elongated, flexible, soft plastic element integrally secured to said base body at each of said base edges between said base body and said vehicle surface;
 (c) a stainless steel foil bonded to the exterior surface of said base body, said foil having opposed foil edges secured to said respective edges of said base body;
 (d) engaging means for securing said base body to said vehicle surface, said engaging means being disposed in said channel and having opposed edges adjacent the interior surface of respective base edges; and
 (e) complementary interlocking means on adjacent surfaces of respective base and engaging means edges for securing said engaging means and said base body together and for restricting thermal expansion in a lateral direction of said base body to prevent enlargement of said opening and loosening of said engaging means in said channel.

2. The trim strip of claim 1 wherein said complementary interlocking means comprises a shoulder projecting from each said engaging means edge disposed in engagement with a complementary recess in the adjacent surface of each respective base edge.

3. The trim strip of claim 1 wherein said complementary interlocking means comprises a shoulder projecting from the interior surface of each said base edge disposed in engagment with a complementary recess in the adjacent surface of each respective engaging means edge.

4. The trim strip as in either claim 2 or 3 wherein said shoulder has a V-shaped cross-section.

5. The trim strip as in any one of claims 1, 2 or 3 wherein said engaging means comprises a planar member having opposed edges each being disposed adjacent the inside surface of a respective base edge, a finger integral with and projecting from one side of said planar member between said opposed edges and engaging the inside surface of said base body, and a leg integral with and projecting from the other side of said planar member between said opposed edges for fixed insertion into a hole in said vehicle surface.

6. The trim strip as in claim 1 wherein each opposed edge of said foil is inwardly bent and secured to the exterior surface of a respective one of said base edges between said base body and said plastic element.

7. The trim strip as in claim 1 wherein each opposed edge of said foil is inwardly bent around and inserted into a respective one of said base edges.

8. The trim strip as in claim 1 also including a flexible, soft plastic layer bonded to and covering said foil.

* * * * *